(12) United States Patent
Bormann et al.

(10) Patent No.: US 11,612,103 B2
(45) Date of Patent: Mar. 28, 2023

(54) METHOD FOR EXECUTING AN AGRICULTURAL WORK PROCESS ON A FIELD

(71) Applicant: CLAAS Selbstfahrende Erntemaschinen GmbH, Harsewinkel (DE)

(72) Inventors: Bastian Bormann, Guetersloh (DE); Joachim Baumgarten, Beelen (DE); Andreas Wilken, Bissendorf (DE); Dennis Neitemeier, Lippetal (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 414 days.

(21) Appl. No.: 16/897,507

(22) Filed: Jun. 10, 2020

(65) Prior Publication Data

US 2021/0015041 A1 Jan. 21, 2021

(30) Foreign Application Priority Data

Jul. 15, 2019 (DE) ...................... 10 2019 119 110.6

(51) Int. Cl.
*A01D 41/127* (2006.01)
*A01B 69/00* (2006.01)
*G05D 1/02* (2020.01)

(52) U.S. Cl.
CPC ........ *A01D 41/1278* (2013.01); *A01B 69/004* (2013.01); *G05D 1/0217* (2013.01); *G05D 1/0287* (2013.01); *G05D 2201/0201* (2013.01)

(58) Field of Classification Search
CPC ................................................ A01D 41/1278
See application file for complete search history.

(56) References Cited

U.S. PATENT DOCUMENTS 5,712,782 A * 1/1998 Weigelt .............. G05B 19/4183
 701/25
7,610,125 B2 * 10/2009 Fitzner ................. A01D 41/127
 701/50

(Continued)

FOREIGN PATENT DOCUMENTS

CA 2637980 A1 * 8/2007 ........... G06F 16/748
CN 107704690 A * 2/2018 ............. G06F 30/20

(Continued)

OTHER PUBLICATIONS

European Search Report dated Dec. 16, 2020 issued in European Application No. 20 16 2269 (with English translation of the relevant parts).

*Primary Examiner* — Shelley Chen
(74) *Attorney, Agent, or Firm* — Collard & Roe, P.C.

(57) ABSTRACT

A method for executing an agricultural work process on a field by means of a group of agricultural work machines. The work machines each have work assemblies which are adjustable with machine parameters for adapting to the respective agricultural conditions. The work machines of the group communicate with one another via a wireless network. The work machines of the group are configured as self-optimizing work machines which each have a driver assistance system for generating and adjusting machine parameters in an automated manner. These machine parameters are optimized with respect to the agricultural conditions. The work machines of the group cooperate collectively in the manner of a virtual work machine.

18 Claims, 2 Drawing Sheets

(56) References Cited

U.S. PATENT DOCUMENTS

| | | | | |
|---|---|---|---|---|
| 8,954,224 | B2* | 2/2015 | Behnke | A01D 41/1277 |
| | | | | 348/148 |
| 9,974,226 | B2* | 5/2018 | Rupp | A01B 79/005 |
| 2006/0200294 | A1 | 9/2006 | Scheufler et al. | |
| 2007/0005209 | A1* | 1/2007 | Fitzner | A01B 79/005 |
| | | | | 701/50 |
| 2015/0302305 | A1* | 10/2015 | Rupp | A01B 79/005 |
| | | | | 706/46 |
| 2017/0049045 | A1* | 2/2017 | Wilken | A01D 34/008 |
| 2017/0188505 | A1* | 7/2017 | Potier | G05D 1/0221 |
| 2018/0317385 | A1 | 11/2018 | Wellensiek et al. | |
| 2019/0364734 | A1 | 12/2019 | Kriebel et al. | |

FOREIGN PATENT DOCUMENTS

| | | | | | |
|---|---|---|---|---|---|
| DE | 4322293 | A1 | | 1/1995 | |
| DE | 4322293 | A1 | * | 1/1995 | ........... A01B 79/005 |
| DE | 4322293 | C2 | * | 5/2003 | ........... A01B 79/005 |
| DE | 102018113327 | A1 | | 12/2019 | |
| DE | 202016009063 | U1 | * | 12/2021 | ........... A01B 59/042 |
| EP | 1692928 | A2 | | 8/2006 | |
| EP | 1741329 | A1 | * | 1/2007 | ........... A01B 79/005 |
| EP | 2110012 | A1 | | 10/2009 | |
| EP | 2110012 | A2 | * | 10/2009 | ........... A01B 79/005 |
| EP | 2110012 | B1 | * | 3/2012 | ........... A01B 79/005 |
| EP | 3139235 | A1 | | 3/2017 | |
| EP | 3400774 | A1 | | 11/2018 | |
| RU | 2018114975 | A | * | 10/2019 | ........... A01D 41/127 |
| RU | 2765084 | C2 | * | 1/2022 | ........... A01D 41/127 |

* cited by examiner

METHOD FOR EXECUTING AN AGRICULTURAL WORK PROCESS ON A FIELD

CROSS-REFERENCE TO RELATED APPLICATIONS

This application claims priority under 35 USC 119 of German Application No. DE 10 2019 119 110.6, filed on Jul. 15, 2019, the disclosure of which is herein incorporated by reference.

BACKGROUND OF THE INVENTION

The invention is directed to a method for executing an agricultural work process on a field by means of a group comprising agricultural work machines.

A group of agricultural work machines is often used for agricultural work processes on fields having large dimensions. In this case, optimal operation of every work machine of the group is especially important in order to maximize the overall efficiency of the work process. This relates in particular to the work assemblies of the work machines. Machine parameters for these work assemblies can be adjusted for adapting to the respective agricultural conditions. Optimizing the machine parameters is particularly important with respect to the above-mentioned efficiency of the work process.

The known method (EP 3 400 774 A1) on which the invention is based relates to the execution of an agricultural work process on a field by means of a group of agricultural work machines which communicate with one another via a wireless data network. In this case, it is provided that a master work machine is designed to be self-optimizing, generates optimized machine parameters and makes these optimized machine parameters available to slave work machines via the wireless data network. The slave work machines, which are not self-optimizing, adopt the optimized machine parameters indiscriminately. Therefore, an individual work machine basically controls the entire group. However, in the course of advancing technologization more and more agricultural work machines have driver assistance systems by means of which they can generate optimized machine parameters for their own work assemblies. While the master-slave system results in gains in efficiency for work machines with a clear hardware hierarchy, there is still potential for groups of agricultural work machines which are all configured to be self-optimizing. In particular, the master-slave system is not flexible enough for such groups.

The post-published German Patent Application DE 10 2018 113 327.8 discloses a method for superordinate fleet control of a group of agricultural work machines in the manner of a top-down control. In this case, based on an overall plan, each work machine is assigned a task which it executes independently.

SUMMARY OF THE INVENTION

The invention is based on the problem of configuring and further developing the known method such that the execution of agricultural work processes in groups of self-optimizing work machines is made more flexible and efficient.

The above-stated problem is solved by a method for executing an agricultural work process on a field by means of a group of agricultural work machines, wherein the work machines of the group have work assemblies in each instance, which work assemblies are adjustable with machine parameters for adapting to the respective agricultural conditions. The work machines of the group communicate with one another via a wireless network, and are configured as self-optimizing work machines which each have a driver assistance system for generating and adjusting machine parameters in an automated manner. The machine parameters are optimized with respect to the agricultural conditions. The work machines of the group cooperate collectively in the manner of a virtual work machine.

A key fundamental insight consists in that rigid hierarchies in a group of agricultural work machines can be replaced by dynamic hierarchies. When the work machines of the group work in concert in the manner of a virtual work machine, it is possible to optimize the entire agricultural work process as such in a flexible manner. When optimizing an individual self-optimizing work machine, it has been the case heretofore that an overall optimization taking into account all influencing factors, including all interrelationships, is practically impossible due to the very high complexity. Instead, subsystems, for example, individual work assemblies, of the self-optimizing work machines are optimized individually and the results of this optimization are combined within the framework of an overall strategy. Depending on the overall strategy, individual subsystems have priority over other subsystems in certain areas and may establish rules for these other subsystems based on their own optimization results. These other subsystems then in turn adapt their own optimizations to these rules. Accordingly, the entire work machine is optimized in the course of a continuous and dynamic exchange which can be modified at any time depending on the overall aim. It is precisely this principle that is now applied to the group of agricultural work machines. Therefore, in order to cooperate in the manner of a virtual work machine, it is essential that the results of the optimization of individual work machines are fed back into the group, where they are used in turn by other work machines and, in particular, are further optimized.

In one embodiment, the agricultural work machines cooperate in the collection of sensor data and can accordingly generate their optimized machine parameters based on a common sensor database. Accordingly, sensors can be economized with respect to the group on the one hand or a significantly greater quantity of sensor data can be incorporated in the optimization on the other hand.

In another embodiment, it can be provided that like work assemblies of the work machines of the group, for example, all threshing units, are combined to form a virtual work assembly, for example, a virtual threshing unit, and that optimized machine parameters are determined for this virtual work assembly.

In one configuration, cooperation is implemented in that a plurality of work machines of the group exchange optimized machine parameters between one another. In this regard, it can be provided that not every work machine optimizes all of its work assemblies, but rather sometimes adopts optimizations of other work machines. Accordingly, it is also possible to divide up the optimization of the entire group between the working machines and to fully exploit the existing hardware in the form of driver assistance systems without having to redundantly carry out virtually identical actions.

The work machines of the group can also operate in part autonomously while using a common database, which is appreciably more flexible especially under less homogeneous field conditions.

In a preferred embodiment, the work machines generate their optimized machine parameters based on field conditions. Since these field conditions must be measured preferably during, or at least immediately prior to, the execution of the agricultural work process, the work machines preferably also cooperate in these measurements in order to learn from the above-mentioned field conditions all the more quickly.

In another embodiment, the work machines of the group cooperate jointly in the manner of a virtual work machine in that they exchange work process data, particularly so as to be georeferenced. These work process data comprise crop conditions and/or crop data and/or current quality data and performance data of the work machines of the group and/or process models.

A fleet process supervisor which, inter alia, can distribute optimization tasks to the work machines can be provided for the coordination and cooperation of the group. Coordination of this kind results in an improved harvesting quality and/or harvesting capacity, since superordinate strategies can be better accounted for.

A synchronization routine can be provided at the start of the execution of the agricultural work process particularly in order to adjust the work machines of the group to one another. A preprocessing routine which is preferably carried out on a back end computer external to the group can also be provided prior to the synchronization routine or generally before the start of the execution of the agricultural work process. This preprocessing routine can serve to determine correction factors so that, for example, differences between the work machines of the group can be discounted during the execution of the work process or the influences of these differences can be mitigated.

In one configuration, the correction factors can be adapted during the execution of the agricultural work process in order to achieve an ongoing improvement of the execution of the work process. The correction factors can be determined on the basis of externally collected reference information about the work machines of the group.

It is possible to calibrate sensors in the group through data of other sensors or even compensate for a sensor failure. As a result of the close cooperation of the work machines, a sensor failure of this kind can be at least partially compensated by means of the sensor data of other work machines.

So as not to have to carry out the same calculations for every group, analogously applicable data of a different group are used and then preferably need only be adapted.

Since very disparate field conditions can also exist to some extent on an individual field, for example, the grain in a depression may be appreciably moister than the grain on the rest of the field, a contribution of a work machine to the virtual work machine can be paused by a user. The group has a quality assurance which can take on this task. Accordingly, it can be ensured that the other work machines of the group are not influenced by inapplicable data.

A user can intervene in the agricultural process for purposes of controlling and/or checking.

The work machines of the group can be agricultural work machines of the same type or different work machines which, however, jointly execute the same agricultural work process. Because of these commonalities, the optimization of the work machines by means of the virtual work machine can be implemented in a particularly efficient manner because like work machines or like work processes frequently require like optimization processes in many machines. In order to map agricultural work processes in all their complexity, the work machines of the group can cooperate with at least one further group. The groups in turn can cooperate in the manner of a virtual work machine.

BRIEF DESCRIPTION OF THE DRAWINGS

The invention will be described in more detail in the following referring to drawings in which only one embodiment example is depicted. The drawings show.

DETAILED DESCRIPTION OF THE EMBODIMENTS

The suggested solution relates to a method for executing an agricultural work process on a field 1 by means of a group 2 of agricultural work machines 3. The term "group" refers to a plurality of agricultural work machines 3 which cooperate in the broadest sense to execute the agricultural work process.

Figure 1:
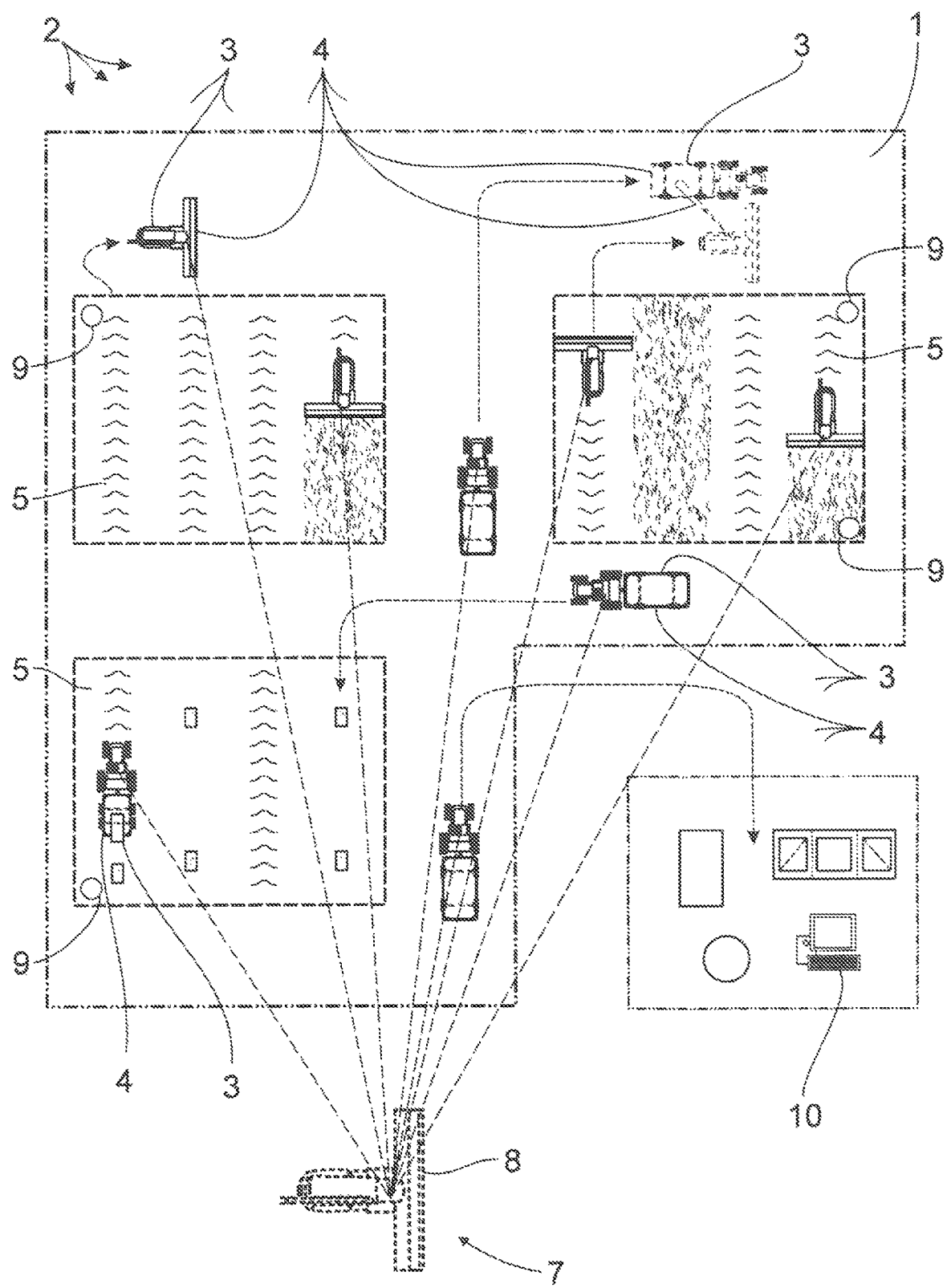
FIG. 1 a group of agricultural work machines during the execution of the suggested method on a field with different field regions.
Figure 2:
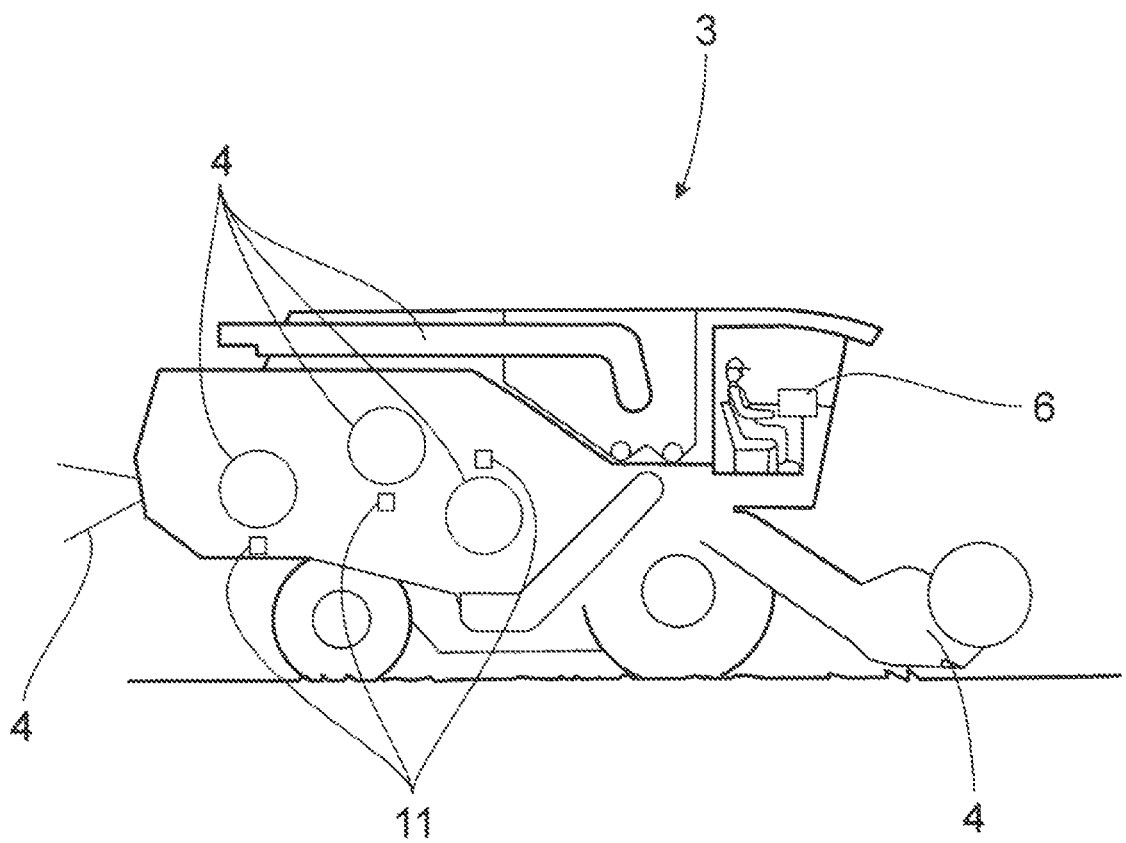
FIG. 2 an example of an agricultural work machine.

The work machines 3 of the group 2 have work assemblies 4 in each instance. The work assemblies 4 serve in particular to execute a harvesting process, preferably directly to process crops. The work assemblies 4 are adjustable with machine parameters for adapting to the respective agricultural conditions, for example, the type and state of the crops, on the field 1. FIG. 1 shows such a group 2 by means of which an agricultural work process is executed on a field 1. The field 1 is divided into a plurality of field zones 5, each of which has different field conditions. To allow the agricultural work machines 3 of the group 2 to work together in the manner to be described later, the work machines 3 of the group 2 communicate with one another via a wireless network. A work machine 3 of this type is shown by way of example in FIG. 2.

The work machines 3 of the group 2 are outfitted as self-optimizing work machines 3. For this purpose, each work machine 3 has a driver assistance system 6 for generating and adjusting machine parameters in an automated manner, which machine parameters are optimized with respect to the agricultural conditions. Since the efficiency with which an agricultural work process is executed is highly dependent on the settings of the work assemblies, such self-optimizing work machines 3 become increasingly important.

It is key that the work machines 3 of the group 2 work in concert in the manner of a virtual work machine 7. In this respect, it is essential that the results of the self-optimization, particularly in the form of the optimized machine parameters of a plurality of work machines 3 of the group 2, are fed back into the group 2 and are further used by other work machines 3 of the group 2. The group 2 preferably has dynamic hierarchies which change depending on the respective task of the group 2 and/or the work machines 3. This means a departure from the master-slave hierarchies. However, it is not ruled out that other, non-self-optimizing work machines are also subordinated to the group or cooperate with the group in that they also contribute to the execution of the agricultural work process. However, they are not part of the group within the meaning of the proposed teaching.

In the present instance and preferably, the work machines 3 of the group 2 generate sensor data, and a plurality of work machines 3 of the group 2 take into account sensor data of other work machines 3 of the group 2 when generating their respective optimized machine parameters. Since an individual work machine 3 of the group 2 can by itself only collect sensor data from a small portion of the field 1, from which it is difficult to infer overall conditions or larger relationships, the advantage of this exchange of sensor data is obvious.

However, entirely in keeping with the suggested cooperation of the work machines 3 of the group 2, there is no need to settle for a simple exchange. It can be provided in addition or alternatively that the work machines 3 of the group 2 jointly collect sensor data and these sensor data are aggregated into virtual sensor data. The term "aggregated" basically only means that the sensor data are compiled. However, the sensor data are preferably processed in an aggregation routine. Accordingly, in particular, a common characteristic diagram can be generated by means of which agricultural conditions, particularly of the field 1, are mapped. The aggregation is preferably carried out by a work machine 7 or, particularly in the manner of a virtual work machine 7, by a plurality of, or by all of, the work machines 3 of the group 2 together. However, it can also be provided that this is carried out, for example, by an external server.

In principle, it is usually the case that a plurality of work machines 3 of the group 2 have the same work assemblies 4. In this case, like work assemblies 4 are preferably combined to form a virtual work assembly 8. To this extent, these virtual work assemblies can form the virtual working machine 7. Optimized machine parameters are preferably determined for the respective virtual work assembly 8, and the optimized machine parameters are subsequently utilized for the respective work assembly 4 by a plurality of work machines 3 of the group 2 which have this work assembly 4.

Like work assemblies 4 need not be combined to form virtual work assemblies 8 for all like work assemblies 4. Preferably, at least work machines 3 of the group 2 which are located in the same field zone 5 combine their work assemblies 4. Accordingly, it is possible not to optimize all of the work assemblies 4 of the group 2 individually but rather to collectively optimize work assemblies 4 having similar characteristics and under similar agricultural conditions so as to guarantee a consistency in the group 2 on the one hand and to economize on computing power on the other hand. It will be explained in the following how the group 2 as a whole can optimize these virtual work assemblies 8. However, as a preferred solution, it may already be mentioned at this point that a respective work machine 3 of the group 2 optimizes a virtual work assembly 8 by generating optimized machine parameters for the latter.

Basically, it can be provided that a plurality of work machines 3 of the group 2 determine in each instance optimized machine parameters for a portion of their respective work assemblies 4 and provide them to other work machines 3 of the group 2. They can receive optimized machine parameters from other work machines 3 of the group 2 for another portion of their respective work assemblies 4, which optimized machine parameters were generated by these other work machines 3 of the group 2. This can be carried out as an alternative to combining work assemblies 4 to form virtual work assemblies 8, but is preferably carried out additionally. Accordingly, it can be provided that certain work assemblies 4 of the work machines 3 of the group 2 are combined, since the respective work machines 3 of the group 2 are similar and are located in a common field zone 5, while other work machines 3 of the group 2 can adopt only a few optimized machine parameters from the other work machines 3 of the group 2. For example, a work machine 3 of the group 2 may work temporarily in a field zone 5 with a high density of pest plants so that there is no comparability, or only a slight comparability, with other work machines 3 of the group 2.

The respective work machines 3 of the group 2 can either directly adopt the received optimized machine parameters of the other work machines 3 of the group 2 or can incorporate them at least partially in their own optimization.

To continue with the example just mentioned where some work machines 3 of the group 2 are not always comparable with the rest of work machines 3 of the group 2, it can be provided that some of the work machines 3 of the group 2 autonomously determine optimized machine parameters for all of their work assemblies 4. However, this is done on the basis of data, particularly sensor data, received from other work machines 3 of the group 2. These sensor data can be virtual sensor data.

Further, it can be provided that the work machines 3 of the group 2, in each instance or collectively, generate the optimized machine parameters based on field conditions. These field conditions may have been generated from the sensor data or may originate from an external source. Examples of field conditions from external sources are weather data or satellite images of the field crop. It is preferably provided that the field conditions are measured at different sampling points 9 on the field 1. It is preferably provided that different work machines 3 of the group 2 are moved to the different sampling points 9 and the respective work machines 3 measure the respective field conditions there so that not every work machine 3 of the group 2 need move to all of the sampling points 9 of the field 1 in order to collect sufficient data for the field conditions. As with the sensor data, the field conditions can be exchanged or aggregated into virtual field conditions.

Before addressing the subject of work distribution in the group 2, it should be mentioned that the work machines 3 of the group 2 preferably cooperate jointly in the manner of a virtual work machine in that they exchange work process data, particularly so as to be georeferenced. These work process data can comprise crop conditions and/or crop data and/or current quality data and performance data of the work machines 3 of the group 2 and/or process models, for example, for processing the above-mentioned characteristic diagrams.

In order to increase harvest output and/or harvest quality, the group 2 preferably has a fleet process supervisor which coordinates and/or delegates the generation of optimized machine parameters. This fleet process supervisor can run on an individual work machine 3 of the group 2, on several work machines 3 of the group 2 or also, for example, on an external server or mobile device. The term "coordinate" and the term "delegate" both refer in this instance to the distribution of tasks. In this regard, the fleet process supervisor ensures that the individual work machines 3 of the group 2 identify and execute their tasks and it therefore coordinates them, or the fleet process supervisor prepares, at least partially, the tasks to be executed and then delegates the execution.

The fleet process supervisor preferably divides the generation of the optimized machine parameters into optimization tasks and distributes the optimization tasks to a plurality of work machines 3 of the group 2. This is advantageous particularly when the optimized machine parameters are generated for the virtual work assemblies 8. The optimization tasks are preferably distributed by the fleet process supervisor based on an outfitting of the work machine 3 of the group 2. This outfitting can refer to the driver assistance system 6 of the respective work machine 3 of the group 2. Accordingly, the optimization tasks can be distributed in such a way that the work machine 3 of the group 2 having the best hardware for this purpose performs the optimization task. This takes into account the fact that the driver assistance systems 6 of the different work machines 3 of the group can be configured in very different ways. The driver assistance systems 6 of the group 2 are possibly even configured in such a way that it is possible to optimize the group 2 based only on the division of work because there is not sufficient computing power available to optimize every work machine 3 of the group 2 autonomously. It should be mentioned here that all of the computing steps within the framework of the suggested method are preferably carried out collectively by the respective driver assistance system 6 of the respective work machine 3 or by a plurality of driver assistance systems 6 of the work machines 3 of the group 2.

While it is conceivable that the work machines 3 of the group 2 begin their cooperation spontaneously, it is preferable that the work machines 3 of the group 2 execute a synchronization routine at the start of the execution of the agricultural work process in which configurations of the work machines 3 are compared with one another and/or correction factors are determined for converting the respective optimized machine parameters between the work machines 3. For example, a combine harvester can have a work assembly 4 having larger dimensions than a similar work assembly 4 of another combine harvester. In this case, these differences are identified and it is preferably determined whether or not optimized machine parameters of one work machine 3 of the group 2 can be converted into optimized machine parameters for another work machine 3 of the group 2 with the help of correction factors which include, generally speaking, any kind of correction rule.

It can also be provided that conflicts between the configurations of the work machines 3 of the group 2 are determined in the synchronization routines and that the conflicts are conveyed to a user and/or automatically resolved. For example, such a conflict may be a crop type erroneously set in one of the work machines 3 of the group 2. If a different type of crop is set in all of the other work machines 3 of the group 2, this conflict can be automatically resolved. However, it can also be provided that the user is notified of the conflict and can react to it.

In order to increase the efficiency of the cooperation of the group 2 even further, and to reduce the computing power required in the group 2 itself, it can be provided that a preprocessing routine is run before the start of the execution of the agricultural work process. This preprocessing routine is preferably run on a back end computer 10 external to the group 2. The back end computer can be a farm computer or can also be a cloud. The correction factors are preferably determined in the preprocessing routine. Additionally or alternatively, moving to the sampling points 9 can be planned in the preprocessing routine. Further additionally or alternatively, the optimized machine parameters can be generated based on a model, particularly a process model, of the virtual work machine 8, and the model is prepared or parameterized in the preprocessing routine. Since agricultural work processes are usually planned in advance and it is also known which work machines 3 are to be employed in a group 2, the coordination of these work machines can accordingly already be carried out in advance.

The correction factors are preferably adapted continuously and/or cyclically and/or in an event-based manner during the execution of the agricultural work process based on the sensor data, particularly virtual sensor data. A maintenance requirement of a work machine 3 can be inferred from the correction factors, particularly from a time curve of the correction factors, either during the execution of the agricultural work process or preferably over a longer period of time, or from a comparison of correction factors of like work machines 3. For example, adaptation needed on a regular basis can indicate aging.

In view of the multifaceted advantages afforded by the ability to retrieve data of past instances of cooperation of agricultural work machines 3 in groups 2, data of the group 2 are preferably stored. These data can be stored on the work machines 3 of the group 2 and/or externally. In particular, the correction factors are preferably stored in a crop-specific manner.

The correction factors are preferably determined on the basis of externally collected reference information about the work machines 3 of the group 2. Such reference information can also be utilized to parameterize the process models. These process models are utilized by the driver assistance system 6 of the respective work machine 3 to determine the optimized machine parameters. The correction factors can also be part of the process models. For example, a process model can map the influence of moisture on the chopping mechanism of a forage harvester. The process models can be specific to the work machine or can map a plurality of work machines of the group 2. The reference information can comprise laboratory data such as grain breakage, protein content, etc. and originate from past work processes.

Since sensors 11 must normally be adjusted and/or calibrated in agricultural work machines 3 also, it can be provided that the sensors 11 of the work machines 3 of the group 2 are adjusted and/or calibrated based on the sensor data of other work machines 3 of the group 2. For example, deviations due to detuning of the sensors caused by aging can be identified and corrected.

Correspondingly, in the event of a sensor outage of a work machine 3 of the group 2, it is even possible that this work machine 3 uses sensor data of at least one other work machine 3 of the group 2 or the virtual sensor data in order to at least partially compensate for the sensor outage. Accordingly, this work machine 3 can be prevented from possible complete failure.

Data of another, similar group can be used during the execution of the agricultural work process and/or in the synchronization routine and/or in the preprocessing routine. Correction factors of the similar group are preferably used and are further preferably adapted in the preprocessing routine and/or in the synchronization routine. This once again economizes on computing power.

Since, as has already been mentioned, some work machines 3 of the group 2 are occasionally not comparable with the other work machines 3 of the group 2, for example, in a field zone 5 with a high density of pest plants or in a depression with high moisture, it is preferably provided that a contribution of a work machine to the virtual work machine can be paused by a user. This user may be a driver, for example, but can also be a group manager.

Additionally or alternatively, the group 2 can have a quality assurance which can exclude and/or pause contributions of a work machine 3 to the virtual work machine 8. For this purpose, the quality assurance preferably evaluates the contributions of a work machine 3 to the virtual work machine 8 according to quality criteria and excludes the contribution or pauses the contribution based on the quality criteria. These quality criteria may relate to the outfitting of the work machine 3 of the group 2 and/or local field conditions of the work machine 3 of the group 2.

As has been mentioned, a user can pause a contribution of a work machine 3 of the group 2 to the virtual work machine 8. For this purpose, but also very generally, it is preferably provided that the user can control and/or check the execution of the agricultural process, particularly by means of a mobile device.

Since groups 2 of agricultural work machines 3 sometimes have very different types of agricultural work machines 3 which cannot, or should not, always be optimized collectively, it can be provided that the work machines 3 of the group 2 are agricultural work machines 3 of the same type, particularly a combine harvester or forage harvester. The latter accordingly have like work assemblies 4. They can then cooperate as virtual work machine 8 of this type. Alternatively, the group 2 can comprise at least one work machine 3 of another type when they collectively execute the same agricultural work process, particularly a process of harvesting the field 1. For example, a group can comprise combine harvesters for harvesting grain and overshot loaders for transporting grain.

Specifically when work machines 3 of one type are combined, it can be provided that the work machines 3 of the group 2 cooperate with at least one further group 2 of agricultural work machines 3 which likewise work together collectively in the manner of a virtual work machine 8. This cooperation can be designed in such a way that the groups 2 work together collectively in the manner of a further virtual, more abstract work machine 8 as virtual group of virtual work machines 8. For example, work machines 3 of the combine harvester type can work together as a group 2, and another group 2 can comprise overshot loaders. These groups 2 can be combined to form a virtual work machine 8, and these two virtual work machines 8 can then in turn work together in the manner of a superordinated virtual work machine 8. The group 2 of combine harvesters would then coordinate the harvesting of the field, the group 2 of overshot loaders would coordinate the transporting of the harvest, and the superordinated group would coordinate the cooperation of the groups 2.

LIST OF REFERENCE NUMERALS

1 Field
2 group
3 agricultural work machine
4 work assembly
5 field zone
6 driver assistance system
7 virtual work machine
8 virtual work assembly
9 sampling point
10 back end computer
11 sensor

What is claimed is:

1. A method for executing an agricultural work process on a field comprising:
providing a group of agricultural work machines, each work machine having work assemblies that are adjustable with machine parameters for adapting to respective agricultural conditions,
communicating between the work machines of the group via a wireless network, wherein the work machines of the group are configured as self-optimizing work machines which each have a driver assistance system, and
generating and adjusting machine parameters via the driver assistance system in an automated manner, wherein the machine parameters are optimized with respect to the agricultural conditions,
wherein the work machines of the group collectively cooperate between each other as a virtual work machine, wherein the optimized machine parameters of a plurality of work machines of the group are fed back into the group and are further used by other work machines of the group, such that a plurality of work machines of the group each generate optimized machine parameters for a portion of their respective work assemblies and make the optimized machine parameters available to other work machines of the group and receive optimized machine parameters from these other work machines of the group for another portion of the respective work assemblies, which optimized machine parameters were generated by these other work machines of the group,
wherein the group has a fleet process supervisor for increasing a harvest output and/or harvest quality, which fleet process supervisor coordinates and/or delegates the generation of optimized machine parameters among the work machines of the group, wherein the fleet process supervisor divides the generation of the optimized machine parameters into optimization tasks and distributes the optimization tasks to a plurality of work machines of the group, wherein the optimization tasks are distributed based on an outfitting of the driver assistance system of each work machine of the group.

2. The method according to claim 1, wherein the work machines of the group generate sensor data, and wherein a plurality of work machines of the group take into account sensor data of other work machines of the group when generating the respective optimized machine parameters, and/or wherein the work machines of the group jointly collect sensor data and these sensor data are aggregated into virtual sensor data.

3. Method according to claim 1, wherein a plurality of work machines of the group have like work assemblies, wherein the like work assemblies are combined to form a virtual work assembly, and wherein optimized machine parameters are generated for the respective virtual work assembly, and the optimized machine parameters are subsequently utilized for the respective work assembly by a plurality of work machines of the group which have this work assembly.

4. The method according to claim 1, wherein some of the work machines of the group autonomously generate optimized machine parameters for all of their work assemblies on the basis of data received from other work machines of the group.

5. The method according to claim 1, wherein the work machines of the group, each or collectively, generate the optimized machine parameters based on field conditions, wherein the field conditions are measured at different sampling points on the field, wherein different work machines of the group are moved to the different sampling points and the respective work machines of the group measure the respective field conditions at each sampling point.

6. The method according to claim 1, wherein the work machines of the group cooperate jointly in the manner of a virtual work machine so as to exchange work process data, particularly so as to be georeferenced, wherein the work process data comprise crop conditions and/or crop data and/or current quality data and performance data of the work machines of the group and/or process models.

7. The method according to claim 1, wherein the work machines of the group execute a synchronization routine at a start of execution of the agricultural work process, wherein in the synchronization routine, configurations of the work machines are compared with one another and/or correction factors are determined for converting the respective optimized machine parameters between the work machines, wherein conflicts between the configurations of the work machines of the group are determined, and wherein the conflicts are conveyed to a user and/or automatically resolved.

8. The method according to claim 5, wherein a preprocessing routine is run on a back end computer external to the group, before a start of the execution of the agricultural work process, wherein the correction factors are determined in the preprocessing routine, and moving to the sampling points is planned in the preprocessing routine, and/or wherein the optimized machine parameters are generated based on a model of the virtual work machine, and wherein the model is prepared or parameterized in the preprocessing routine.

9. The method according to claim 7, wherein the correction factors are adapted continuously and/or cyclically and/or in an event-based manner during the execution of the agricultural work process based on the sensor data, particularly virtual sensor data, wherein a maintenance requirement of a work machine is inferred from the correction factors.

10. The method according to claim 7, wherein the correction factors are determined on the basis of externally collected reference information about the work machines of the group.

11. The method according to claim 2, wherein sensors of the work machines of the group are adjusted and/or calibrated based on the sensor data of other work machines of the group.

12. The method according to claim 11, wherein, in the event of a sensor outage of a work machine of the group, the work machine having the sensor outage uses sensor data of at least one other work machine of the group or virtual sensor data of the group of work machines in order to at least partially compensate for the sensor outage.

13. The method according to claim 1, wherein data of another group are used during the execution of the agricultural work process and/or in the synchronization routine and/or in the preprocessing routine, wherein correction factors of the other group are used and wherein the correction factors of the other group are adapted in the preprocessing routine and/or in the synchronization routine.

14. The method according to claim 1, wherein a contribution of a work machine to the virtual work machine can be paused by a user.

15. The method according to claim 1, wherein the group has a quality assurance which can exclude and/or pause contributions of a work machine of the group to the virtual work machine, wherein the quality assurance evaluates the contributions of a work machine of the group to the virtual work machine according to quality criteria and excludes the contribution or pauses the contribution based on the quality criteria, wherein the quality criteria relate to outfitting of the work machine of the group and/or local field conditions of the work machine of the group.

16. The method according to claim 1, wherein a user can control and/or check the execution of the agricultural process by means of a mobile device.

17. The method according to claim 1, wherein the work machines of the group are agricultural work machines of the same type and accordingly have similar work assemblies and cooperate as a virtual work machine of this type, or wherein the work machines of the group comprise at least one work machine of another type and collectively execute the same agricultural work process.

18. The method according to claim 1, wherein the work machines of the group cooperate with at least one further group of agricultural work machines which work together collectively in the manner of a virtual work machine, wherein the groups work together collectively in the manner of a further virtual work machine as virtual group of virtual work machines.

* * * * *